(12) United States Patent
Yanaka (10) Patent No.: US 11,378,424 B2
(45) Date of Patent: Jul. 5, 2022

(54) ABNORMALITY IDENTIFICATION DEVICE AND IDENTIFICATION METHOD

(71) Applicant: NEC Platforms, Ltd., Kawasaki (JP)

(72) Inventor: Takeshi Yanaka, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 127 days.

(21) Appl. No.: 16/755,994

(22) PCT Filed: Oct. 17, 2018

(86) PCT No.: PCT/JP2018/038652
§ 371 (c)(1),
(2) Date: Apr. 14, 2020

(87) PCT Pub. No.: WO2019/078249
PCT Pub. Date: Apr. 25, 2019

(65) Prior Publication Data
US 2020/0300673 A1    Sep. 24, 2020

(30) Foreign Application Priority Data
Oct. 20, 2017 (JP) .............................. JP2017-203662

(51) Int. Cl.
*G01D 5/353* (2006.01)
(52) U.S. Cl.
CPC ..... *G01D 5/35335* (2013.01); *G01D 5/35338* (2013.01)
(58) Field of Classification Search
CPC .................. G01D 5/35335; G01D 5/35338
See application file for complete search history.

(56) References Cited

U.S. PATENT DOCUMENTS 4,451,916 A * 5/1984 Casper ............. H04B 10/25891
398/5
5,831,753 A * 11/1998 Hochstuhl .............. H04B 10/07
398/16
(Continued)

FOREIGN PATENT DOCUMENTS

JP    H04-291523 A    10/1992
JP    H04-301934 A    10/1992
(Continued)

OTHER PUBLICATIONS

International Search Report for PCT Application No. PCT/JP2018/038652, dated Dec. 18, 2018.
(Continued)

*Primary Examiner* — Jonathan M Hansen (57) ABSTRACT

In order to enable an area suspected of having a communication abnormality to be identified from among a communication device and a communication path that constitute a communication system, this abnormality identification device is provided with: a first output unit which outputs first information that is information indicating the suitability of a transmission signal to be supplied to a communication channel; a second output unit which outputs second information that is information indicating the suitability of a reception signal corresponding to the transmission signal that has arrived via the communication channel; and a third output unit which outputs third information that is information indicating the suitability of a signal obtained by applying predetermined processing to the reception signal.

13 Claims, 9 Drawing Sheets

(56) References Cited

U.S. PATENT DOCUMENTS

| 8,811,816 B2* | 8/2014 | Li ........................... H04L 41/22 |
| | | 398/25 |
| 2011/0038267 A1* | 2/2011 | Smith ..................... H04L 43/50 |
| | | 370/248 |
| 2011/0116789 A1* | 5/2011 | Wellbrock .......... H04J 14/0291 |
| | | 398/5 |
| 2017/0034716 A1* | 2/2017 | Dortschy .............. H04W 24/02 |

FOREIGN PATENT DOCUMENTS

| JP | 07-38506 A | 2/1995 |
| JP | 2007-067481 A | 3/2007 |
| JP | 2017-103510 A | 6/2017 |

OTHER PUBLICATIONS

English translation of Written opinion for PCT Application No. PCT/JP2018/038652.

* cited by examiner

| No | LED136a | LED327aa | LED327ab | LED136b | LED327ba | LED327bb | ABNORMALITY SUSPECTED AREA |
|---|---|---|---|---|---|---|---|
| 1 | ○ ABNORMAL | ○ SIGNAL PRESENT | ○ SIGNAL PRESENT | — | — | — | COMMUNICATION DEVICE 101a RECEPTION UNIT |
| 2 | — | — | × SIGNAL ABSENT | — | — | — | COMMUNICATION DEVICE 101a TRANSMISSION UNIT |
| 3 | — | — | — | — | × SIGNAL ABSENT | — | COMMUNICATION DEVICE 101b TRANSMISSION UNIT |
| 4 | — | — | — | ○ ABNORMAL | ○ SIGNAL PRESENT | ○ SIGNAL PRESENT | COMMUNICATION DEVICE 101b RECEPTION UNIT |
| 5 | — | × SIGNAL ABSENT | — | — | ○ SIGNAL PRESENT | — | OPTICAL FIBER 306a |
| 6 | — | — | ○ SIGNAL PRESENT | — | — | × SIGNAL ABSENT | OPTICAL FIBER 306b |

ABNORMALITY IDENTIFICATION DEVICE AND IDENTIFICATION METHOD

This application is a National Stage Entry of PCT/JP2018/038652 filed on Oct. 17, 2018, which claims priority from Japanese Patent Application 2017-203662 filed on Oct. 20, 2017, the contents of all of which are incorporated herein by reference, in their entirety.

TECHNICAL FIELD

The present invention relates to a device that outputs presence and absence of an abnormality in a communication system.

BACKGROUND ART

There is known a method of, in a communication system including two communication devices and an optical fiber connecting the communication devices, taking out a part of light passing through the optical fiber, and detecting an abnormality in communication status from intensity or the like of the light.

PTL 1 discloses an optical repeater that monitors whether a level of input light to an optical fiber amplifier is equal to or more than a predetermined value, and outputs a predetermined alarm signal in response to detection of a fact that the level of the input light to the optical fiber amplifier has become lower than the predetermined value.

CITATION LIST

Patent Literature

[PTL 1] Japanese Unexamined Patent Application Publication No. H07-038506

SUMMARY OF INVENTION

Technical Problem

However, the method disclosed by PTL 1 is not able to determine whether a cause of an abnormality in communication status is attributed to a failure of a communication device or breaking or the like of a line. This may produce a waste of replacing, as a suspected area, even a part where no failure occurs between the communication device and an optical line.

An object of the present invention is to provide an abnormality identification device and the like that enable an area suspected of having a communication abnormality to be identified from a communication device and a communication path that constitute a communication system.

Solution to Problem

An abnormality identification device according to the present invention includes: a first output unit that outputs first information being information representing suitability of a transmission signal to be supplied to a communication channel; a second output unit that outputs second information being information representing suitability of a reception signal associated with the transmission signal arriving via the communication channel; and a third output unit that outputs third information being information representing suitability of a signal acquired by applying predetermined processing to the reception signal.

Advantageous Effects of Invention

An abnormality identification device and the like according to the present invention enable an area suspected of having a communication abnormality to be identified from a communication device and a communication path that constitute a communication system.

EXAMPLE EMBODIMENT

[Configuration and Operation]

Figure 1:
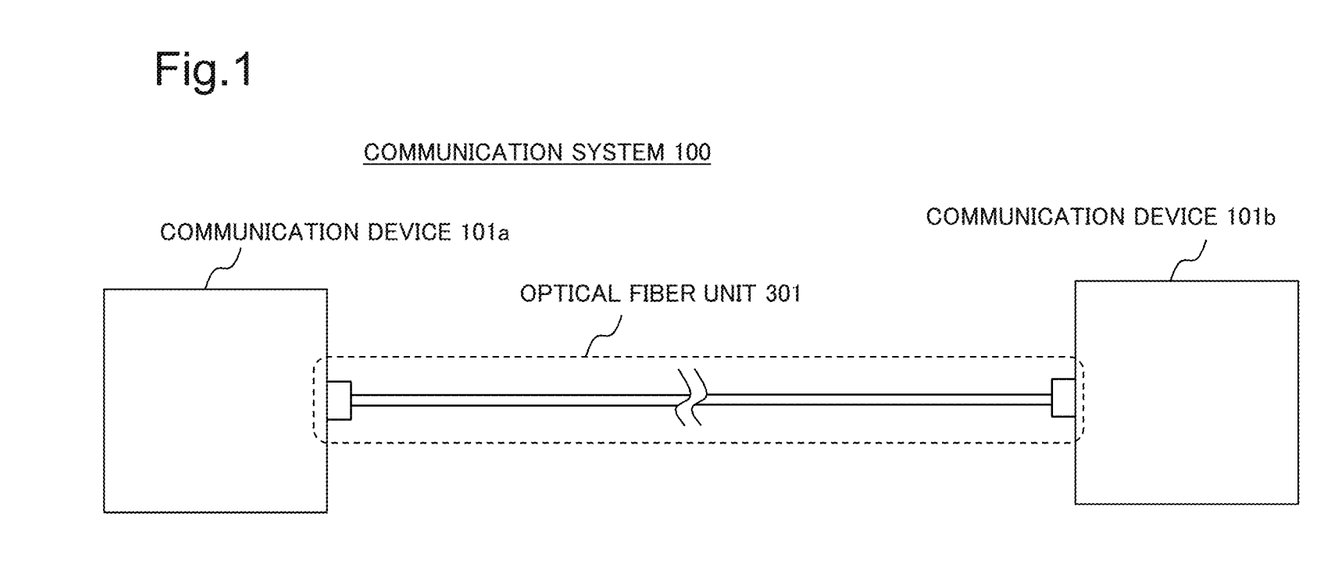
FIG. 1 is a conceptual diagram representing a configuration example of a communication system according to the present example embodiment.

FIG. 1 is a conceptual diagram representing a configuration of a communication system 100 being an example of a communication system according to the present example embodiment.

The communication system 100 includes communication devices 101a and 101b, and an optical fiber unit 301.

The communication device 101a and the communication device 101b communicate via the optical fiber unit 301.

One of the communication devices 101a and 101b is, for example, a host device (management device) of a disc system. In this case, the other of the communication devices 101a and 101b is a disc device of the disc system.

An example of each of the communication devices 101a and 101b is described later with reference to FIGS. 2 and 3.

The optical fiber unit 301 includes a pair of optical fibers. One of the optical fibers of the optical fiber pair is a channel of an optical signal sent to the communication device 101b from the communication device 101a. The other optical fiber of the optical fiber pair is a channel of an optical signal sent to the communication device 101a from the communication device 101b. An example of the optical fiber unit 301 is described later with reference to FIGS. 4 and 5.

Figure 2:
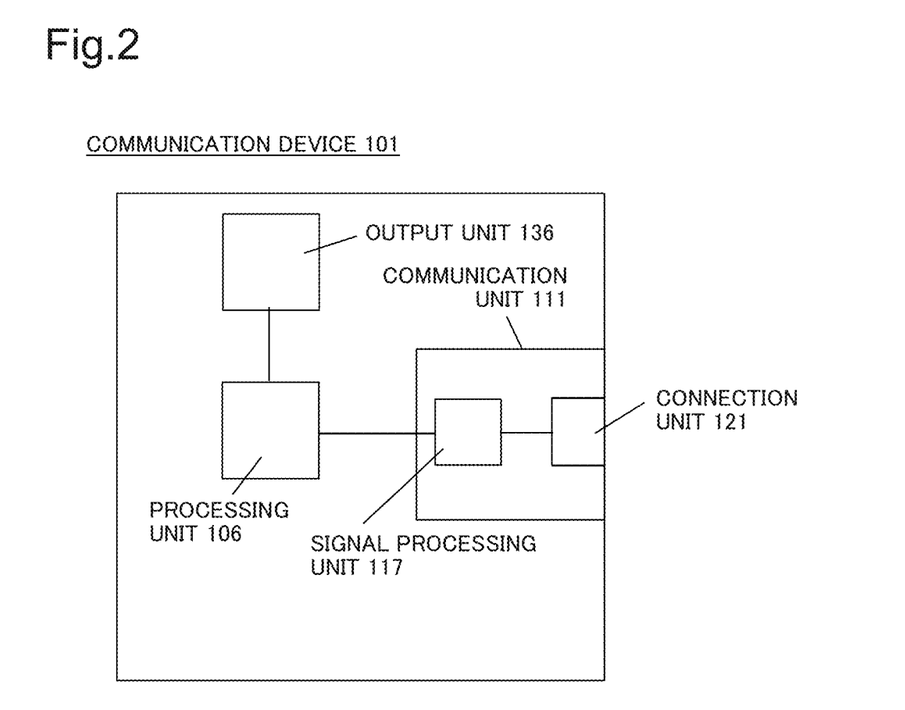
FIG. 2 is a conceptual diagram representing a configuration example of a communication device.

FIG. 2 is a conceptual diagram representing a configuration of a communication device 101 being an example of each of the communication devices 101a and 101b represented in FIG. 1.

The communication device 101 includes a processing unit 106, a communication unit 111, and an output unit 136.

The communication unit 111 includes a signal processing unit 117 and a connection unit 121.

The connection unit 121 is connected, by fitting or the like, to a connection portion (see a connection portion 321 represented in FIG. 5 described later) of the optical fiber unit 301 represented in FIG. 1.

The signal processing unit 117 performs predetermined processing for an electric signal sent from the connection unit 121, and sends a processed electric signal to the processing unit 106.

The signal processing unit 117 performs predetermined processing for an electric signal sent from the processing unit 106, and sends a processed electric signal to the connection unit 121.

When the communication device 101 is a host device or a disc device of the previously described disc system, the communication unit 111 is, for example, a host bus adapter card.

The processing unit 106 determines whether an abnormality occurs in a communication performed with a partner communication device, from an electric signal sent from the signal processing unit 117 to the connection unit 121 and an electric signal sent from the connection unit 121 to the signal processing unit 117. The processing unit 106 performs the determination by, for example, determining whether a signal to be received with regard to a signal sent to the partner communication device is sent.

When determining that an abnormality occurs between the communication device 101 and the partner communication device, the processing unit 106 instructs the output unit 136 to output information representing the determination result.

The output unit 136 outputs the information indicated by the instruction, in accordance with the instruction from the processing unit 106. The output unit 136 is, for example, a display unit such as a display or a light emitting unit such as an LED. Herein, the LED is an abbreviation of a light emitting diode.

Figure 3:
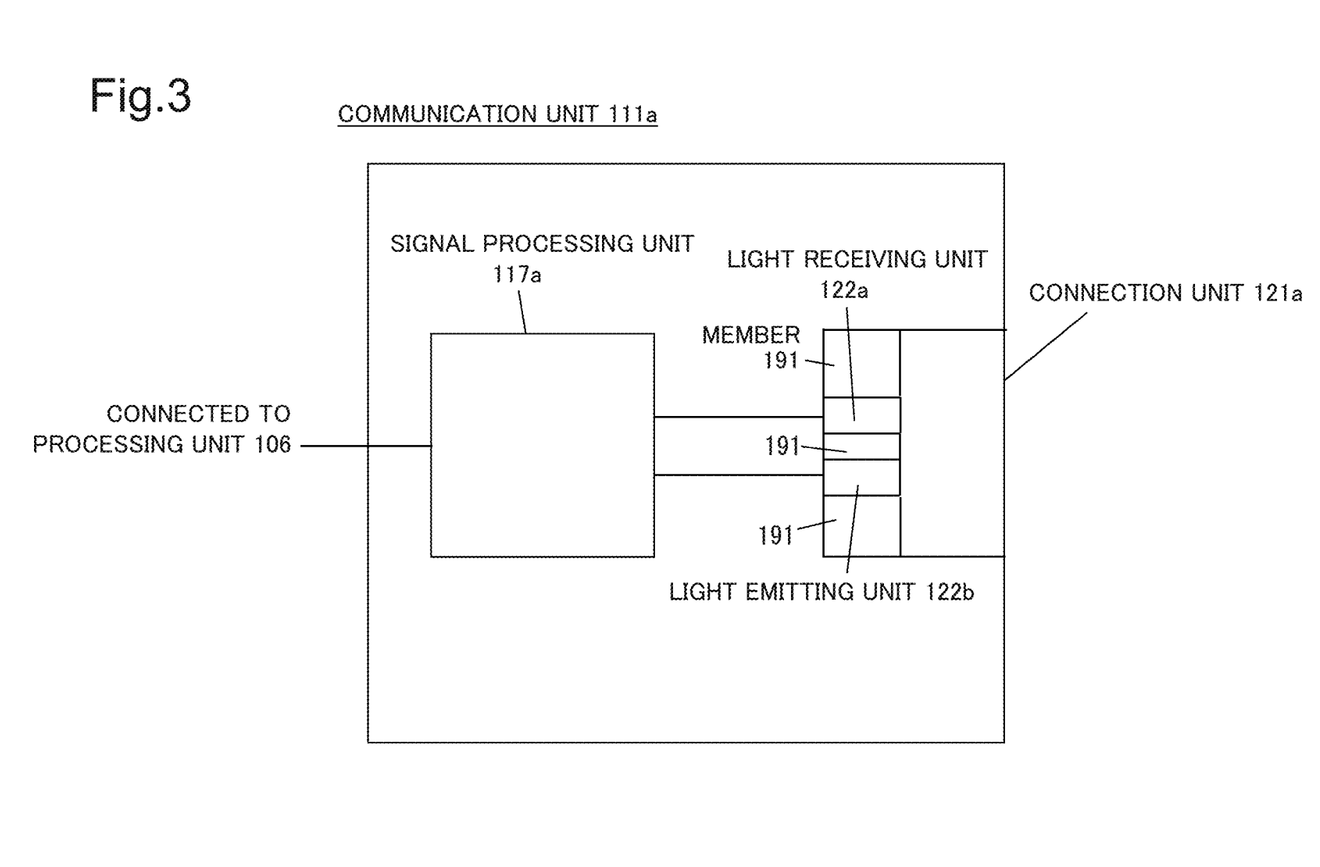
FIG. 3 is a conceptual diagram representing a configuration example of a communication unit.

FIG. 3 is a conceptual diagram representing a configuration of a communication unit 111a being an example of the communication unit 111 represented in FIG. 2.

The communication unit 111a includes a signal processing unit 117a and a connection unit 121a.

The connection unit 121a includes a light receiving unit 122a and a light emitting unit 122b. The light receiving unit 122a and the light emitting unit 122b are fixed to the connection unit 121a by a member 191.

The connection unit 121a is connected, by fitting or the like, to a connection portion (see the connection portion 321 represented in FIG. 5 described later) of the optical fiber unit 301 represented in FIG. 1.

In the connected state, the light receiving unit 122a is brought into a state of being capable of receiving light released from an associated optical fiber (see an optical fiber 306ab represented in FIG. 5 described later) included in the connection portion of the optical fiber unit 301. In the connected state, the light emitting unit 122b is brought into a state of being capable of inputting light released to an associated optical fiber (see an optical fiber 306bb represented in FIG. 5 described later) included in the connection portion of the optical fiber unit 301.

Figure 4:
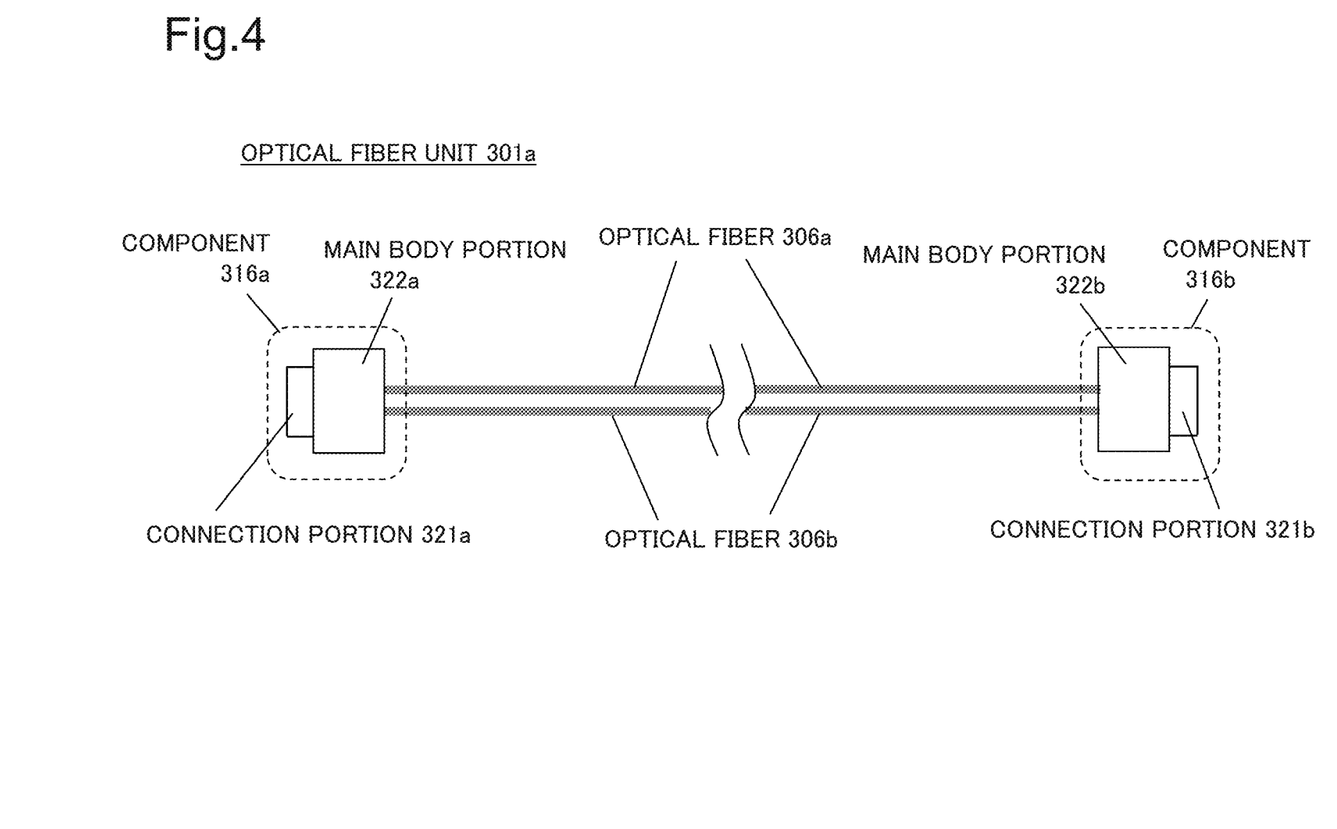
FIG. 4 is a conceptual diagram representing a configuration example of an optical fiber unit.

FIG. 4 is a conceptual diagram representing a configuration of an optical fiber unit 301a being an example of the optical fiber unit 301 represented in FIG. 1.

The optical fiber unit 301a includes components 316a and 316b, and optical fibers 306a and 306b.

The component 316a includes a connection portion 321a and a main body portion 322a.

The component 316b includes a connection portion 321b and a main body portion 322b.

The connection portion 321a of the component 316a can be connected, by fitting or the like, to the connection unit 121, represented in FIG. 2, of the communication device 101a represented in FIG. 1. On the other hand, the connection portion 321b of the component 316b can be connected, by fitting or the like, to the connection unit 121, represented in FIG. 2, of the communication device 101b represented in FIG. 1.

When an optical signal is input from the optical fiber 306a, the main body portion 322a outputs information representing the fact.

When an optical signal is output to the optical fiber 306b, the main body portion 322a outputs information representing the fact.

When an optical signal is output to the optical fiber 306a, the main body portion 322b outputs information representing the fact.

When an optical signal is input from the optical fiber 306b, the main body portion 322b outputs information representing the fact.

Figure 5:
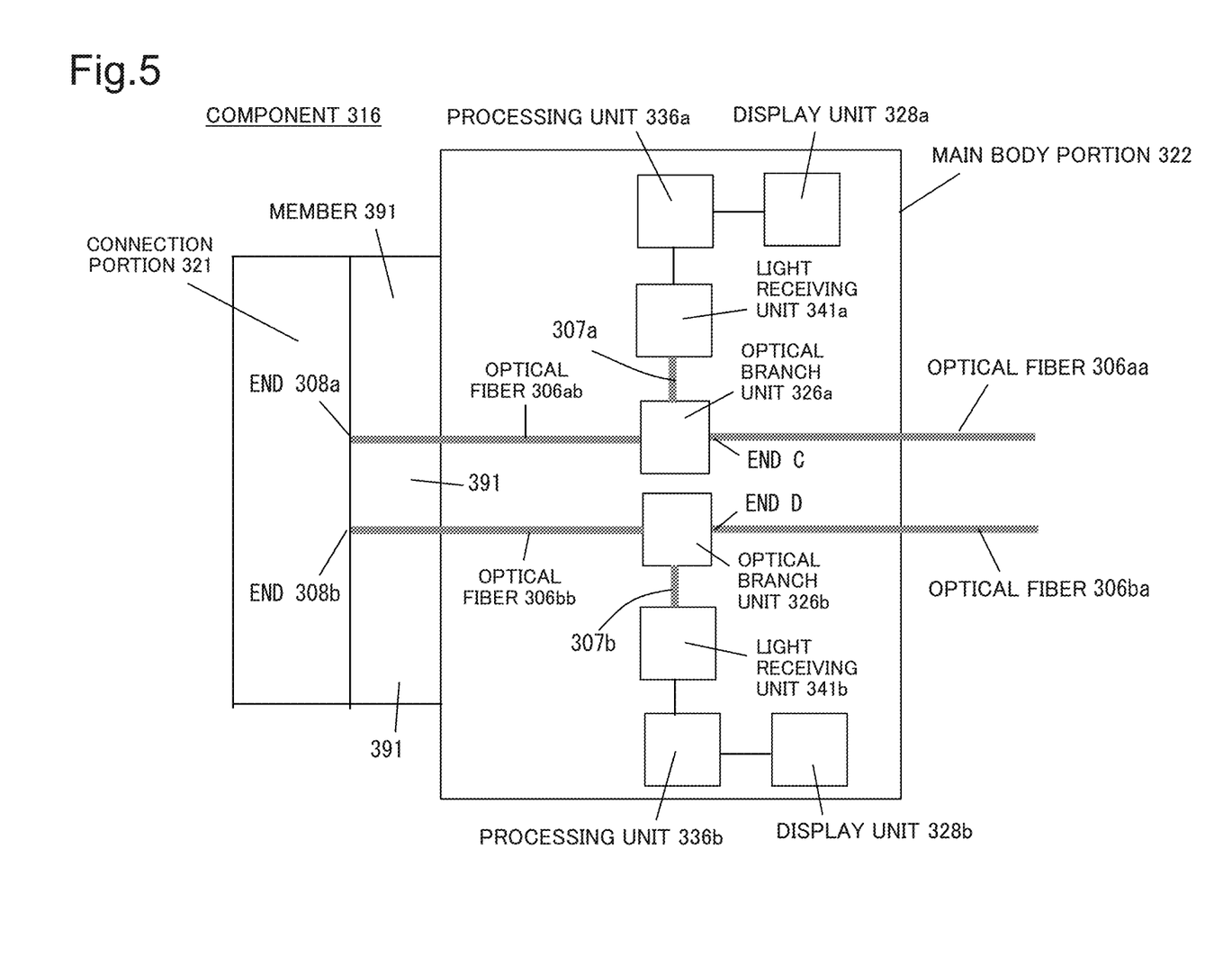
FIG. 5 is a conceptual diagram representing a configuration example of a component represented in FIG. 4.

FIG. 5 is a conceptual diagram representing a configuration of a component 316 being an example of each of the components 316a and 316b represented in FIG. 4.

The component 316 includes optical fibers 306ab, 306bb, 307a, and 307b, optical branch units 326a and 326b, light receiving units 341a and 341b, processing units 336a and 336b, and display units 328a and 328b. Note that an optical fiber 306aa represented in FIG. 5 is one of the optical fibers 306a and 306b represented in FIG. 4 through which an optical signal is input to the component 316. An optical fiber 306ba represented in FIG. 5 is one of the optical fibers 306a and 306b represented in FIG. 4 through which an optical signal is output from the component 316.

The optical branch unit 326a inputs a part of light input from the optical fiber 306aa, to the light receiving unit 341a through the optical fiber 307a. The rest of the light input from the optical fiber 306aa is input to the optical fiber 306ab.

The vicinity of an end 308a of the optical fiber 306ab and the vicinity of an end 308b of the optical fiber 306bb are fixed to the connection portion 321 by a member 391.

The light input to the optical fiber 306ab is output from the end 308a. The light output from the end 308a is input to the light receiving unit 122a in a state where the connection portion 321 is connected to the connection unit 121a represented in FIG. 3.

On the other hand, in a state where the connection portion 321 is connected to the connection unit 121a represented in FIG. 3, the light output from the light emitting unit 122b is input to the optical fiber 306bb from the end 308b. The light input to the optical fiber 306bb is input to the optical branch unit 326b through the optical fiber 306bb.

The optical branch unit 326b inputs a part of light input from the end D, to the light receiving unit 341b via the optical fiber 307b. The optical branch unit 326b inputs the rest of the light to the optical fiber 306ba.

The light receiving unit 341a converts, into an electric signal, an optical signal sent from the optical branch unit 326a through the optical fiber 307a. The light receiving unit 341a inputs, to the processing unit 336a, the electric signal resulting from the conversion. Note that the light receiving unit 341a may also be referred to as a second detection unit below.

When an electric signal is sent from the light receiving unit 341a, the processing unit 336a instructs the display unit 328a to display, for a certain time from a point of the sending of the electric signal, information representing that the electric signal is sent. The processing unit 336a includes a timer for displaying, for the certain time, information representing that the electric signal is sent. Note that the processing unit 336a may also be referred to as a second derivation unit below.

The display unit 328a displays the information indicated by the instruction, in accordance with the instruction from the processing unit 336a. The display unit 328a is, for example, a display or a lamp.

The light receiving unit 341b converts, into an electric signal, an optical signal sent from the optical branch unit 326b through the optical fiber 307b. The light receiving unit 341b inputs, to the processing unit 336b, the electric signal resulting from the conversion. Note that the light receiving unit 341b may also be referred to as a first detection unit below.

When an electric signal is sent from the light receiving unit 341b, the processing unit 336b instructs the display unit 328b to display, for a certain time from a point of the sending of the electric signal, information representing that the electric signal is sent. The processing unit 336b includes a timer for displaying, for the certain time, information representing that the electric signal is sent. Note that the processing unit 336b may also be referred to as a first derivation unit below.

The display unit 328b displays the information indicated by the instruction, in accordance with the instruction from the processing unit 336b. The display unit 328b is, for example, a display or a lamp.

As a consequence, when an optical signal is input to the component 316 from the optical fiber 306aa, the component 316 displays, by the display unit 328a, information representing the fact. When an optical signal is output to the optical fiber 306ba from the component 316, the component 316 displays, by the display unit 328b, information representing the fact.

Next, an abnormal area identification method utilizing the communication system according to the present example embodiment is described.

Figure 6:
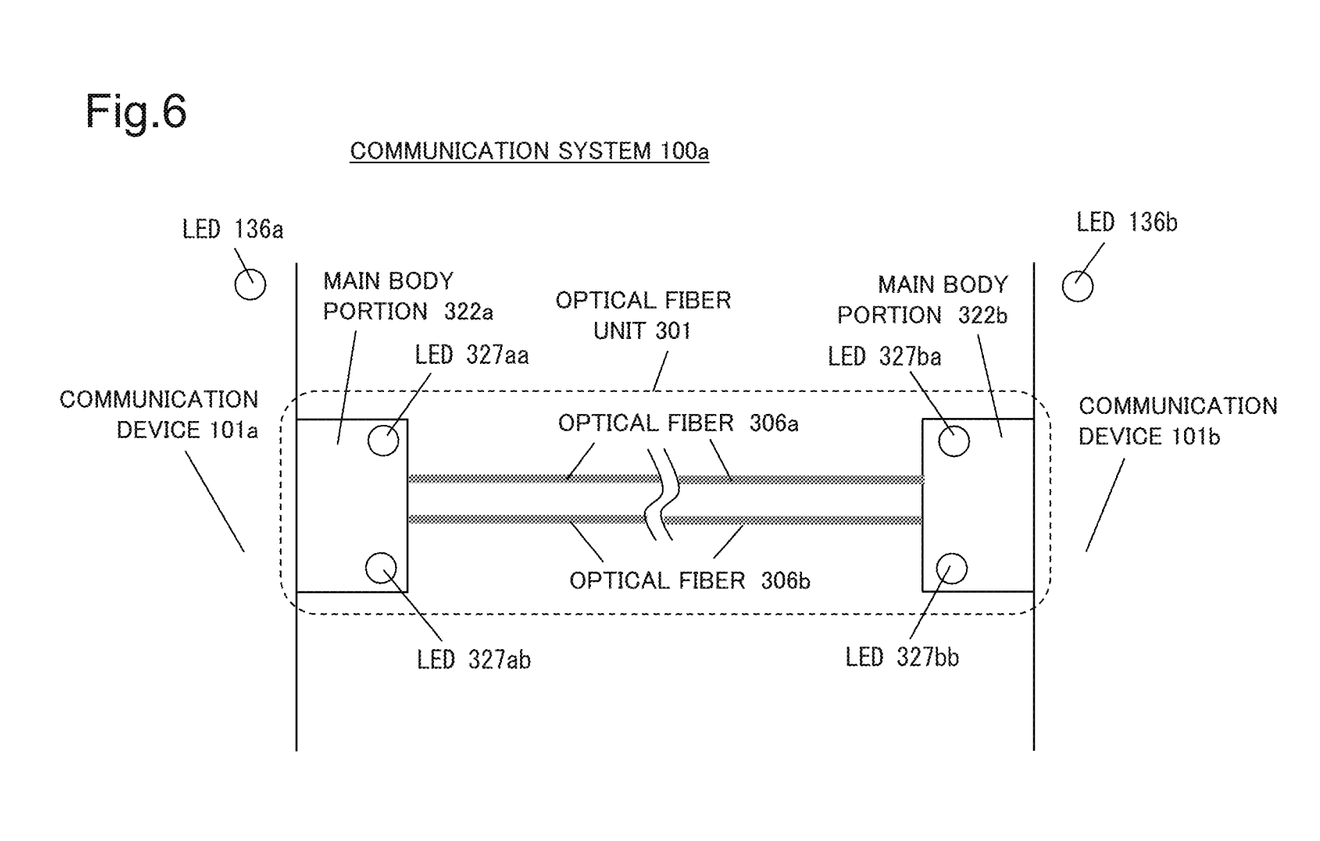
FIG. 6 is a conceptual diagram representing an example of the communication system according to the present example embodiment.

FIG. 6 is a conceptual diagram representing a communication system 100a being an example of the communication system according to the present example embodiment.

The communication system 100a includes communication devices 101a and 101b, and an optical fiber unit 301.

The communication device 101a includes an LED 136a. The LED 136a is an example of the output unit 136 represented in FIG. 2 in the communication device 101a. In other words, when detecting, in the communication device 101a, an abnormality in a communication with the communication device 101b, the LED 136a displays information representing the fact. Herein, it is assumed that the information is on of the LED 136a.

The communication device 101b includes an LED 136b. The LED 136b is an example of the output unit 136 represented in FIG. 2 in the communication device 101b. In other words, when detecting, in the communication device 101b, an abnormality in a communication with the communication device 101a, the LED 136b displays information representing the fact. Herein, it is assumed that the information is on of the LED 136b.

Note that the following description premises that no abnormality occurs in the main body portion and in connection between the main body portion and the communication device.

The optical fiber unit 301 includes the main body portions 322a and 322b, and the optical fibers 306a and 306b.

The optical fibers 306a and 306b are the optical fibers 306a and 306b represented in FIG. 4.

The main body portions 322a and 322b are the main body portions 322a and 322b represented in FIG. 4.

The main body portion 322a includes LEDs 327aa and 327ab. The LED 327aa is an example of the display unit 328a represented in FIG. 5 in the main body portion 322a. The LED 327ab is an example of the display unit 328b represented in FIG. 5 in the main body portion 322a.

The main body portion 322b includes LEDs 327ba and 327bb. The LED 327ba is an example of the display unit 328b represented in FIG. 5 in the main body portion 322b. The LED 327bb is an example of the display unit 328a represented in FIG. 5 in the main body portion 322b.

First, a case where, in the communication system 100a, the LED 136a is off and the LED 136b is on is assumed as a first case. The first case is a case where the communication device 101b detects a communication abnormality, but the communication device 101a does not detect a communication abnormality.

In the first case, it is assumed that all the LEDs 327aa to 327bb are on.

In this case, since the LED 327bb is on, it can be determined that a communication from the communication device 101a to the main body portion 322b is performed. Thus, a part relating to transmission in the communication device 101a, and a communication path from the communication device 101a to the main body portion 322b can be excluded from an area suspected of having an abnormality.

Since the LED 327aa is on, it can be determined that a communication from the communication device 101b to the main body portion 322a is performed. Thus, a part relating to transmission in the communication device 101b, and a communication path from the communication device 101b to the main body portion 322a can be excluded from an area suspected of having an abnormality.

Since the LED 136a is off, a reception part of the communication device 101a can be excluded from the suspected area.

As a consequence, in this case, a reception part of the communication device 101b can be identified as a suspected area.

In the first case, it is assumed that the LEDs 327aa and 327ba are off, and the LEDs 327ab and 327bb are on.

In this case, it can be determined that a communication from the communication device 101a to the communication device 101b through the optical fiber 306b is performed. Thus, a part relating to transmission in the communication device 101a, and a communication path from the communication device 101a to the main body portion 322b can be excluded from an abnormality suspected area.

Since the LED 327ba is off, a transmission part of the communication device 101b can be identified as a suspected area.

In the first case, it is assumed that the LEDs 327aa and 327ba are on, and the LEDs 327ab and 327bb are off.

In this case, it can be determined that a communication from the communication device 101b to the communication device 101a through the optical fiber 306a is performed. Thus, a part relating to transmission in the communication device 101b, and a communication path from the communication device 101b to the main body portion 322a can be excluded from an abnormality suspected area.

In this case, it can be determined that input of an optical signal from the communication device 101a to the optical fiber 306b is not performed. Thus, a transmission part of the communication device 101a can be identified as an abnormality suspected area.

In the first case, it is assumed that the LED 327ab is on, and the LED 327bb is off. In this case, it can be determined that sending of an optical signal is interrupted in the optical fiber 306b. Thus, the optical fiber 306b can be identified as an abnormality suspected area.

Next, a case where, in the communication system 100a, the LED 136a is on and the LED 136b is off is assumed as a second case. The second case is a case where the communication device 101a detects a communication abnormality, but the communication device 101b does not detect a communication abnormality.

Furthermore, in the second case, it is assumed that all the LEDs 327aa to 327bb are on.

In this case, since the LED 327aa is on, it can be determined that a communication from the communication device 101b to the main body portion 322a is performed. Accordingly, a part related to transmission in the communication device 101b, and the optical fiber 306a are able to be excluded from an abnormality suspected area.

In this case, since the LED 327bb is on, it can be determined that a communication from the communication device 101a to the main body portion 322b is performed. Accordingly, a part related to transmission in the communication device 101a, and the optical fiber 306b are able to be excluded from an abnormality suspected area.

As a consequence, a reception part of the communication device 101a can be identified as a suspected area.

In the second case, it is assumed that the LEDs 327aa and 327ba are on, and the LEDs 327ab and 327bb are off. In this case, it can be determined that a communication from the communication device 101a to the main body portion 322a is not performed. Thus, a transmission part of the communication device 101a can be identified as a suspected area.

In the second case, it is assumed that the LED 327ba is on, and the LED 327aa is off. In this case, it can be determined that the optical fiber 306a is disconnected. Thus, the optical fiber 306a can be identified as an abnormality suspected area.

As described above, an abnormality suspected area can be identified by a combination of an abnormality detection result in each of the communication devices 101a and 101b, and information (an on-status of an LED) representing passage statuses of an optical signal on a transmission side and a reception side in each main body portion. The identification is performed from a transmission unit and a reception unit of each communication device, and each optical fiber.

Figure 7:
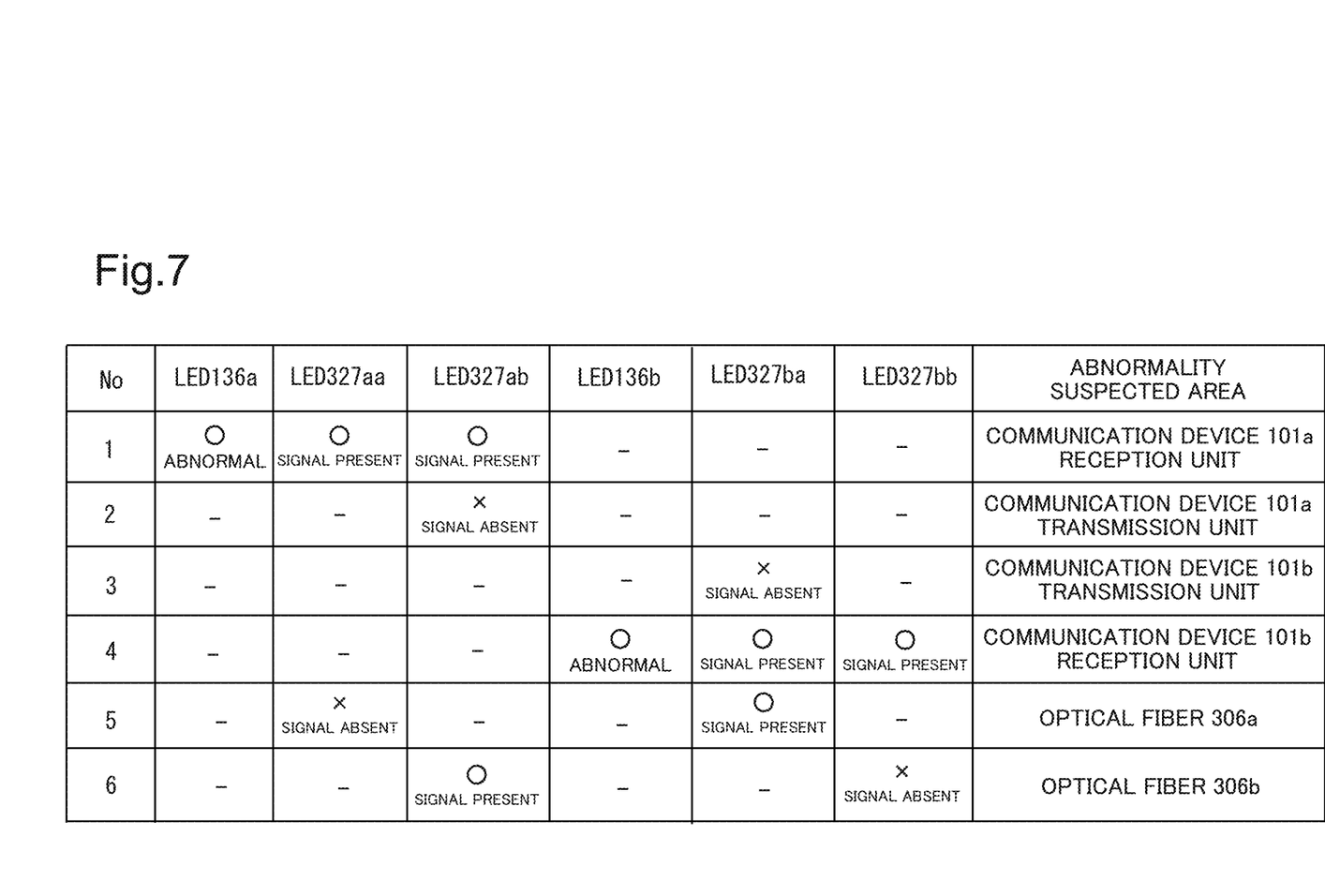
FIG. 7 is a diagram representing a relation between a combination of on-statuses of a plurality of LEDs and an abnormality suspected area.

FIG. 7 is a diagram representing a relation between a combination of on-statuses of a plurality of LEDs represented in FIG. 6 and an abnormality suspected area. A circular mark represented in FIG. 7 represents that an LED provided with the circular mark is on. A cross mark represented in FIG. 7 represents that an LED provided with the cross mark is off. A hyphen represented in FIG. 7 represents that confirmation of whether an LED provided with the hyphen is on or off is not necessary. Description of contents represented by FIG. 7 is apparent from FIG. 7, and therefore, is omitted.

Figure 8:
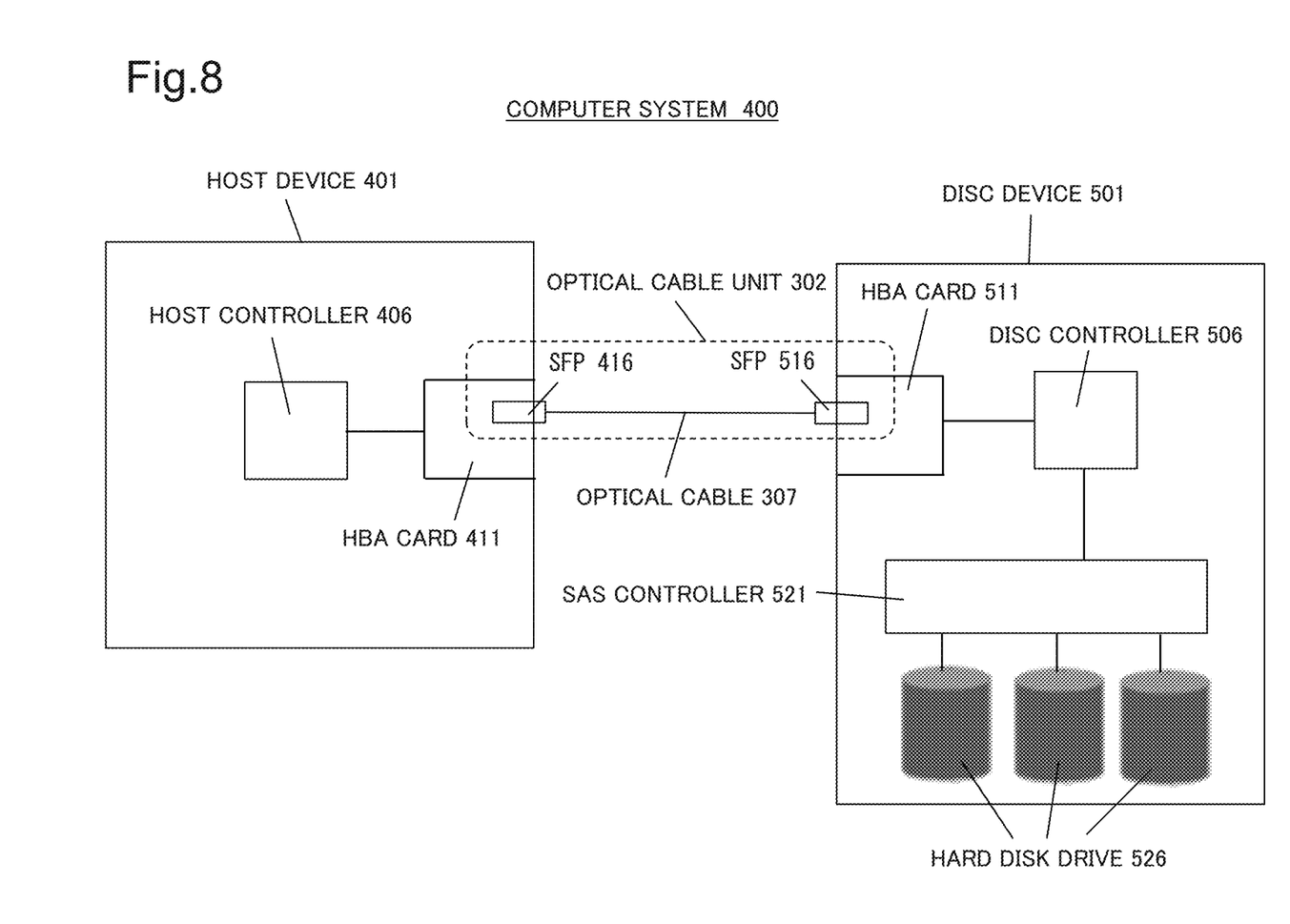
FIG. 8 is a conceptual diagram representing an example of the communication system according to the present example embodiment.

FIG. 8 is a conceptual diagram representing a configuration of a computer system 400 being a specific example of the communication system according to the present example embodiment.

The computer system 400 includes a host device 401, a disc device 501, and an optical cable unit 302.

The host device 401 includes a host controller 406 and an HBA card 411. Herein, HBA is an abbreviation of a host bus adapter.

The disc device 501 includes a disc controller 506, an HBA card 511, an SAS controller 521, and a hard disk drive 526.

The optical cable unit 302 includes SFPs 416 and 516, and an optical cable 307. Herein, the SFP is an optical module called small form-factor pluggable.

The host device 401 is an example of one of the communication devices 101a and 101b represented in FIG. 1. In this case, the host controller 406 and the HBA card 411 are, in this order, examples of the processing unit 106 and the communication unit 111 represented in FIG. 2.

The disc device 501 is an example of one of the communication devices 101a and 101b represented in FIG. 1 that is not the host device 401. In this case, the disc controller 506 and the HBA card 511 are, in this order, examples of the processing unit 106 and the communication unit 111 represented in FIG. 2.

The optical cable unit 302 is an example of the optical fiber unit 301a represented in FIG. 4. In this case, the SFPs 416 and 516 are examples of the connection unit 121a represented in FIG. 3. The optical cable 307 is an example of the optical fibers 306a and 306b represented in FIG. 4.

In the computer system 400, control of the hard disk drive 526 by the SAS controller 521 is controlled by a control signal that the disc controller 506 sends to the SAS controller 521. Herein, the SAS is an abbreviation of a serial attached small computer system interface. Further, the disc controller 506 is controlled by the host device 401 through a communication with the host controller 406. The communication is performed via the HBA cards 411 and 511, and the optical cable unit 302.

Advantageous Effect

The communication system according to the present example embodiment outputs presence and absence of a communication abnormality in each communication system, and outputs presence and absence of arrival of an optical signal in a component of an optical cable for connection to each communication device. The communication system performs the output of presence and absence of arrival in input and output in a connection unit with each communication device. An area suspected of having a communication abnormality and an area excludable from a suspected area can be identified by combining and then considering presence and absence of a communication abnormality in each communication device, and presence and absence of an input optical signal and an output optical signal in each component for connection, as described above. In other words, the communication system enables an area suspected of having a communication abnormality to be identified from each communication device and an optical fiber.

The above description describes an example in which a person identifies an abnormality suspected area by combining presence and absence of a communication abnormality in each communication device, and presence and absence of an input optical signal and an output optical signal in each component for connection. However, the communication system according to the present example embodiment may automatically identify and output an abnormality suspected area by a combination of output signals representing presence and absence of a communication abnormality in each communication device, and presence and absence of an input optical signal and an output optical signal in each component for connection. In this case, the communication system includes an output unit for the output. The output unit is, for example, a display unit.

Figure 9:
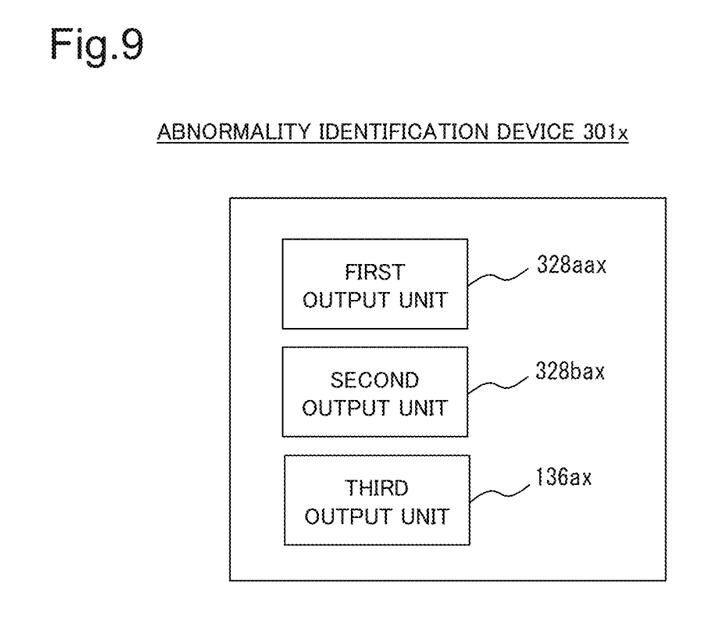
FIG. 9 is a conceptual diagram representing a minimum configuration of a communication path device according to an example embodiment.

FIG. 9 is a block diagram representing a configuration of an abnormality identification device 301x being a minimum configuration of an abnormality identification device according to an example embodiment.

The abnormality identification device 301x includes a first output unit 328aax, a second output unit 328bax, and a third output unit 136ax.

The first output unit 328aax outputs first information being information representing suitability of a transmission signal to be supplied to a communication channel.

The second output unit 328bax outputs second information being information representing suitability of a reception signal associated with the transmission signal arriving via the communication channel.

The third output unit 136ax outputs third information being information representing suitability of a signal acquired by applying predetermined processing to the reception signal.

When the first information represents suitableness, the second information represents suitableness, and the third information represents unsuitableness, a reception destination of the reception signal can be identified as the abnormality suspected area.

When the first information represents suitableness, and the second information represents unsuitableness, the communication channel can be identified as the abnormality suspected area.

When the first information represents unsuitableness, a transmission source of the transmission signal can be identified as the abnormality suspected area.

As described above, an abnormality suspected area can be identified by a combination of outputs of a plurality of output units, from the first communication device, the second communication device, and the communication path.

In other words, the abnormality identification device 301x enables an area suspected of having a communication abnormality to be identified from a communication device and a communication path that constitute a communication system.

Thus, the abnormality identification device 301x provides, by the above-described configuration, an advantageous effect described in the section Advantageous Effect Note that the first output unit 328aax represented in FIG. 9 is, for example, the LED 327ab or the LED 327ba. The second output unit 328bax is, for example, the LED 327aa or the LED 327bb. The third output unit 136ax is, for example, the LED 136a or the LED 136b represented in FIGS. 6 and 7.

While each example embodiment of the present invention has been described above, the present invention is not limited to the example embodiments described above, and a further modification, substitution, or adjustment can be made without departing from the basic technical concept of the present invention. For example, a configuration of an element illustrated in each drawing is one example for assisting in understanding of the present invention, and is not limited to the configuration illustrated in each of these drawings.

Some or all of the above-described example embodiments can be also described as, but are not limited to, the following supplementary notes.

(Supplementary Note 1)

An abnormality identification device including:

a first output unit that outputs first information being information representing suitability of a transmission signal to be supplied to a communication channel;

a second output unit that outputs second information being information representing suitability of a reception signal associated with the transmission signal arriving via the communication channel; and a third output unit that outputs third information being information representing suitability of a signal acquired by applying predetermined processing to the reception signal.

(Supplementary Note 2)

The abnormality identification device according to Supplementary Note 1, wherein the first information is information related to presence and absence of the transmission signal.

(Supplementary Note 3)

The abnormality identification device according to Supplementary Note 1 or 2, wherein the second information is information related to presence and absence of the reception signal.

(Supplementary Note 4)

The abnormality identification device according to any one of Supplementary Notes 1 to 3, wherein the third information is information indicating whether the reception signal includes a response signal to a predetermined sending signal, the response signal being sent to a transmission source of the transmission signal by a reception destination of the reception signal.

(Supplementary Note 5)

The abnormality identification device according to any one of Supplementary Notes 1 to 4, wherein the third output unit is included in a reception destination of the reception signal.

(Supplementary Note 6)

The abnormality identification device according to any one of Supplementary Notes 1 to 5, wherein the first output unit is included in a first component connecting the communication channel and a transmission source that transmits the transmission signal.

(Supplementary Note 7)

The abnormality identification device according to any one of Supplementary Notes 1 to 6, wherein the second output unit is included in a second component connecting the communication channel and a reception destination of the reception signal.

(Supplementary Note 8)

The abnormality identification device according to any one of Supplementary Notes 1 to 7, further including a first detection unit that sends, to a first derivation unit deriving the first information, a detection result related to suitability of the transmission signal.

(Supplementary Note 9)

The abnormality identification device according to any one of Supplementary Notes 1 to 8, further including a second detection unit that sends, to a second derivation unit deriving the second information, a detection result related to suitability of the transmission signal.

(Supplementary Note 10)

The abnormality identification device according to Supplementary Note 8, further including a first branch unit that inputs a part of the transmission signal to the first detection unit.

(Supplementary Note 11)

The abnormality identification device according to Supplementary Note 9, further including a second branch unit that inputs a part of the reception signal to the second detection unit.

(Supplementary Note 12)

The abnormality identification device according to any one of Supplementary Notes 1 to 11, wherein the first output unit includes a first light emitting unit, and causes the first light emitting unit to emit light for a first period by the first information.

(Supplementary Note 13)

The abnormality identification device according to Supplementary Note 12, further including a first timer for causing the first light emitting unit to emit light for the first period.

(Supplementary Note 14)

The abnormality identification device according to any one of Supplementary Notes 1 to 13, wherein the second output unit includes a second light emitting unit, and causes the second light emitting unit to emit light for a second period by the second information.

(Supplementary Note 15)

The abnormality identification device according to Supplementary Note 14, further including a second timer for causing the second light emitting unit to emit light for the second period.

(Supplementary Note 16)

The abnormality identification device according to any one of Supplementary Notes 1 to 11, wherein the first output unit includes a first light emitting unit, and causes the first light emitting unit to emit light for a first period by the first information, the second output unit includes a second light emitting unit, and causes the second light emitting unit to emit light for a second period by the second information, and the first period is substantially equal to the second period.

(Supplementary Note 17)

The abnormality identification device according to any one of Supplementary Notes 1 to 16, wherein the communication channel is an optical channel.

(Supplementary Note 18)

The abnormality identification device according to any one of Supplementary Notes 1 to 17, further including:

a fourth output unit that outputs fourth information being information representing suitability of a second transmission signal to be supplied to the communication channel by a reception destination of the reception signal;

a fifth output unit that outputs fifth information being information representing suitability of a second reception signal associated with the second transmission signal arriving at a transmission source of the transmission signal via the communication channel; and a sixth output unit that outputs sixth information being information representing suitability of a signal acquired by applying predetermined second processing to the second reception signal.

(Supplementary Note 19)

An identification method including identifying an abnormality suspected area by first information being information representing suitability of a transmission signal to be supplied to a communication channel, second information being information representing suitability of a reception signal associated with the transmission signal arriving via the communication channel, and third information being information representing suitability of a signal acquired by applying predetermined processing to the reception signal.

(Supplementary Note 20)

The identification method according to Supplementary Note 19, wherein, when the first information represents suitableness, the second information represents suitableness, and the third information represents unsuitableness, a reception destination of the reception signal is identified as the abnormality suspected area.

(Supplementary Note 21)

The identification method according to Supplementary Note 19 or 20, wherein, when the first information represents suitableness, and the second information represents unsuitableness, the communication channel is identified as the abnormality suspected area.

(Supplementary Note 22)

The identification method according to any one of Supplementary Notes 19 to 21, wherein, when the first information represents unsuitableness, a transmission source of the transmission signal is identified as the abnormality suspected area.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2017-203662, filed on Oct. 20, 2017, the disclosure of which is incorporated herein in its entirety by reference.

REFERENCE SIGNS LIST

100 Communication system
101a, 101b Communication device
106 Processing unit
111, 111a Communication unit
117, 117a Signal processing unit
121, 121a Connection unit
122a Light receiving unit
122b Light emitting unit
136 Output unit
136a, 136b, 327aa, 327ab, 327ba, 327bb LED
136ax Third output unit
191, 391 Member
301, 301a Optical fiber unit
301x Abnormality identification device
306a, 306aa, 306ab, 306b, 306ba, 306bb, 307a, 307b Optical fiber
307 Optical cable
308a, 308b End
316, 316a, 316b Component
321, 321a, 321b Connection portion
322, 322a, 322b Main body portion
328aax First output unit
328bax Second output unit
328a, 328b Display unit
341a, 341b Light receiving unit
333a Light emitting unit
336a, 336b Processing unit
400 Computer system 401 Host device
406 Host controller
411, 511 HBA card
416 SFP
501 Disc device
506 Disc controller
521 SAS controller
526 Hard disk drive

What is claimed is:

1. An abnormality identification device comprising:
a first output unit that outputs first information representing transmission suitability of a transmission signal to be supplied to a communication channel;
a second output unit that outputs second information representing reception suitability of a reception signal associated with the transmission signal arriving via the communication channel; and
a third output unit that outputs third information representing signal suitability of a signal acquired by the reception signal, wherein
the first information is related to presence and absence of the transmission signal,
the second information is related to presence and absence of the reception signal,
the third information indicates whether the reception signal includes a response signal to a predetermined sending signal, the response signal being sent to a transmission source of the transmission signal by a reception destination of the reception signal,
the first output unit includes a first light emitting unit, and causes the first light emitting unit to emit first light for a first period by the first information,
the second output unit includes a second light emitting unit, and causes the second light emitting unit to emit second light for a second period by the second information, and
an abnormality suspected area is identified by a combination of the third information, a first on-status of the first light emitting unit, and a second on-status of the second light emitting unit.

2. The abnormality identification device according to claim 1, wherein the third output unit is included in the reception destination of the reception signal.

3. The abnormality identification device according to claim 1, wherein the first output unit is included in a first component connecting the communication channel and the transmission source that transmits the transmission signal.

4. The abnormality identification device according to claim 1, wherein the second output unit is included in a second component connecting the communication channel and the reception destination of the reception signal.

5. The abnormality identification device according to claim 1, further comprising a first detection unit that sends, to a first derivation unit deriving the first information, a detection result related to the transmission suitability of the transmission signal.

6. The abnormality identification device according to claim 1, further comprising a second detection unit that sends, to a second derivation unit deriving the second information, a detection result related to the transmission suitability of the transmission signal.

7. The abnormality identification device according to claim 5, further comprising a first branch unit that inputs a part of the transmission signal to the first detection unit.

8. The abnormality identification device according to claim 6, further comprising a second branch unit that inputs a part of the reception signal to the second detection unit.

9. The abnormality identification device according to claim 1, further comprising a first timer for causing the first light emitting unit to emit the first light for the first period.

10. The abnormality identification device according to claim 1, further comprising a second timer for causing the second light emitting unit to emit the second light for the second period.

11. The abnormality identification device according to claim 1, wherein the first period is equal to the second period.

12. The abnormality identification device according to claim 1, wherein the communication channel is an optical channel.

13. The abnormality identification device according to claim 1, further comprising:
a fourth output unit that outputs fourth information being information representing second transmission suitability of a second transmission signal to be supplied to the communication channel by the reception destination of the reception signal;
a fifth output unit that outputs fifth information being information representing second reception suitability of a second reception signal associated with the second transmission signal arriving at the transmission source of the transmission signal via the communication channel; and
a sixth output unit that outputs sixth information being information representing signal suitability of a second signal acquired by the second reception signal.

* * * * *